United States Patent
Creamer et al.

(10) Patent No.: US 6,343,119 B1
(45) Date of Patent: Jan. 29, 2002

(54) ACCESS TO EXTENDED TELEPHONE SERVICES VIA THE INTERNET

(75) Inventors: Thomas Edward Creamer, Boca Raton, FL (US); Zygmunt Anthony Bloeslaw Gerard Lozinski, Winchester (GB); Baiju Dhirajlal Mandalia, Boca Raton; Pradeep Parsram Mansey, Coral Springs, both of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,483

(22) Filed: Oct. 29, 1999

Related U.S. Application Data

(63) Continuation of application No. 08/835,147, filed on Apr. 4, 1997.

(51) Int. Cl.[7] .............................................. H04M 11/00
(52) U.S. Cl. ............................ 379/100.01; 379/90.01; 379/100.09
(58) Field of Search ........................ 379/90.01, 100.01, 379/100.09, 88.13, 100.13, 93.01, 215, 93.35, 201, 207, 211; 358/403, 407; 370/352

(56) References Cited

U.S. PATENT DOCUMENTS

| | | | | |
|---|---|---|---|---|
| 5,805,587 A | * | 9/1998 | Norris et al. | 379/90.01 |
| 5,809,128 A | * | 9/1998 | McMullin | 379/93.35 |
| 6,167,123 A | * | 12/2000 | Kwok et al. | 379/100.01 |

* cited by examiner

*Primary Examiner*—Stella Woo
*Assistant Examiner*—Melur Ramakrishnaiah
(74) *Attorney, Agent, or Firm*—Robert Lieber; Richard A. Tomlin

(57) ABSTRACT

The present invention affords a predefined class of authorized users of the PSTN (public switched telephone network) access to extended telephone services through public communication networks external to the PSTN, the latter networks including the web and Internet. Authorized users in the predefined class can receive the extended services at residences, offices, and locations remote from both residences and offices. Authorized users can activate respective extended services through the external networks, and can do so without having to communicate with telephone company representatives. Resource management intelligence of the PSTN is adapted to link to the external networks for communicating with and delivering extended telephone services to the authorized users. Extended telephone services include variations of presently standard telephone services such as call waiting, caller ID, call forwarding facsimile image transmittal, voice mail, etc. Presently contemplated adaptations of PSTN intelligence include adaptations allowing for the interception of analog telephone signals and the redirection of the intercepted signals in digital form through external data communication networks such as the web. A web user who is also in the class of authorized PSTN users can activate and receive delivery of extended telephone services at a computer linked to the PSTN intelligence through the web, regardless of how and where the connection to the web is made. Thus, the web user can receive the extended services through a telephone line associated with a base telephone account (e.g. a line in a respective residence or office), as well as through a line (telephone or other) separate from and/or remote from the associated telephone line.

9 Claims, 8 Drawing Sheets

20 — Without present adaptation, telephone services assigned to base line 2 are confined only to PSTN resources 22 — With adaptation, PSTN can provide (authorized) user of line 2 with extended telephone services, at computer connected to external network (e.g. local computer 5 or remote computer 16, Fig. 1)

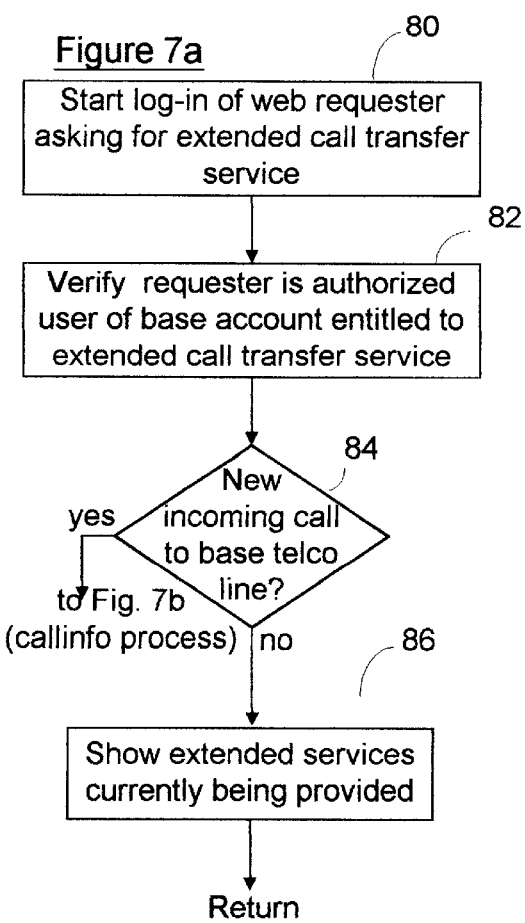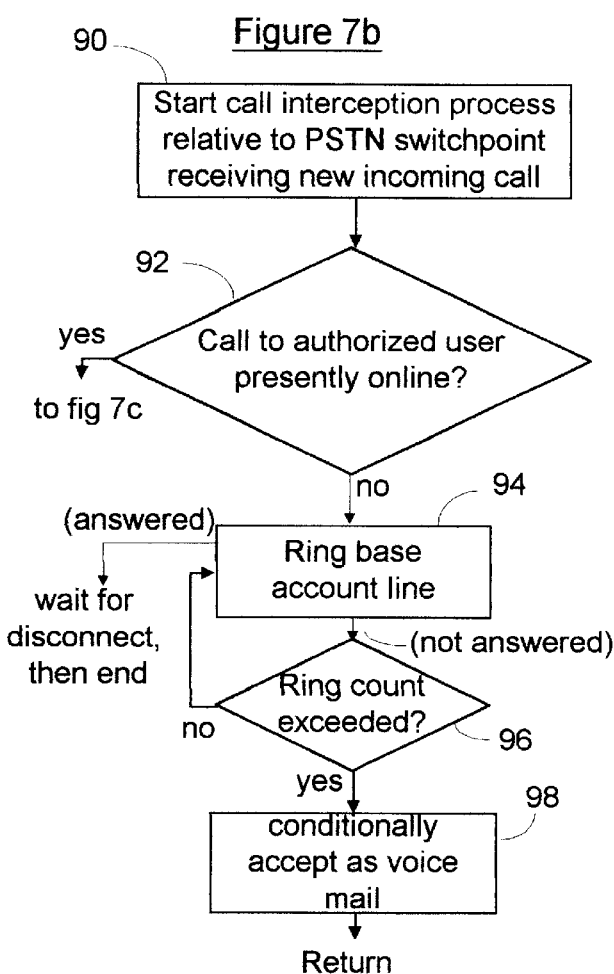

ACCESS TO EXTENDED TELEPHONE SERVICES VIA THE INTERNET

CROSS-REFERENCES TO RELATED APPLICATIONS

This application is a continuation of application Ser. No. 08/835,147 filed Apr. 4, 1997.

1. Patent application Ser. No. 08/792,018 by D. L. Acker et al, filed , 1997 and titled MULTISERVICE PLATFORM ARCHITECTURE FOR TELEPHONE NETWORKS, discloses an intelligent peripheral multiprocessor system for control of call processing and user services in the public switched telephone network (PSTN). That system is shown in the referenced application as representing a component of control in a larger regional system conforming to the AIN (Advanced Intelligent Network) architecture now becoming standard in the PSTN. The present invention is directed to an improved application for regional AIN centers of the PSTN, which would operate most efficiently in an AIN center containing an intelligent peripheral component subsystem of the type disclosed in the referenced application.

2. Patent application Ser. No. 08/803,407 by B. D. Mandalia et al, filed , 1997 and titled MULTIMEDIA WEB PAGE APPLICATIONS, discloses a system for adapting AIN intelligence to distribute signals originating as telephone fax transmissions to selected parties via the Internet/web. The present application is related in that it concerns an application for adapting AIN intelligence to selectively distribute telephone signals other than fax signals through the web; specifically, signals pertaining to telephone line services and associated service functions.

3. Patent application Ser. No. 08/761,257 by J. M. Dunn et al, filed Dec. 6, 1996 and titled USER INVOCATION OF SERVICES IN PUBLIC SWITCHED TELEPHONE NETWORK VIA PARALLEL DATA NETWORKS, discloses a system for enabling users of telephone lines in the PSTN to operate via computers and a data network parallel to respective telephone lines (e.g. the Internet or web) to communicate with AIN intelligence of the PSTN for controlling services applicable to respective telephone lines.

4. Patent application Ser. No. 08/761,249 by J. M. Dunn et al, filed Dec. 6, 1996 and titled MULTIMEDIA CONFERENCING USING PARALLEL NETWORKS, discloses a system for enabling participants in a voice telephone conference on the PSTN to exchange document image data during the conference and vary parameters of the conference (e.g. add and drop participants), via a parallel data network such as the web, wherein the administration of the conference parameters is accomplished through data communications with AIN intelligence over the external data network.

5. Patent application Ser. No. 08/830,148 by T. Creamer et al, filed on the same date as the present application and entitled EXTENDED TELEPHONE SERVICES VIA TELEPHONE LINES SHARED FOR STANDARD TELEPHONY AND INTERNET ACCESS, describes provision of extended telephone services to telephone users through the web or Internet, wherein the connection to the web or Internet is made through a telephone line that is shared for standard telephony, so that users can selectively react to telephone call activities waiting for connection to the shared line.

DEFINITION OF TERMS USED IN THIS APPLICATION

For this application, the following definitions apply:

The PSTN is the aggregate of all instrumentalities providing and managing telephone call connections between members of the public at large, but excluding instrumentalities that are restricted to special groups of users; e.g. PBX's, Centrexes, etc.

A "base telephone account" is an account assigned to a specific customer of the PSTN; an example of such an account would be an account to which telephone calls associated with a specific telephone line are charged (including calls originating at the respective line and calls to that line with reverse charges accepted).

An "authorized user" of a base telephone account is either a customer to whom the account is charged or a party authorized by the customer to use and modify telephone services (standard and extended) to which the account is subscribed.

A standard telephone service is a telephone service delivered to end users of telephone services through communication routes entirely internal to the PSTN.

An extended telephone service, newly defined here, is a telephone service delivered to end users of telephone services through communication routes that are partially internal to the PSTN and partially external to the PSTN (e.g. communication routes extending between internal switch ports in the PSTN and a computer, via the web or Internet).

BACKGROUND OF THE INVENTION

This invention pertains generally to provision of extended telephone services as defined above. More particularly, the invention pertains to adaptation of AIN intelligence in the PSTN to allow for delivery of extended telephone services as defined above to authorized users of base accounts subscribed to such services. An extended telephone service may (but need not necessarily) comprise a variation of a standard telephone service that is deliverable through networks external to the PSTN (e.g. the web or Internet, satellite radio networks, etc).

In today's PSTN, end users of standard telephone services (as defined above) have limited options for varying and utilizing respective services.

Parameters relevant to delivery of a standard telephone service can be modified by an authorized end user, but delivery of the respective service invariably remains confined exclusively to the PSTN. For example, parameters of a standard service such as call forwarding can be modified to provide AIN intelligence of the PSTN with a series of telephone numbers within the PSTN that represent alternate destinations to which telephone calls incoming to a telephone line associated with a given base account are to be routed, but these alternate destinations are effectively reachable today only through transmission routes internal to the PSTN. Furthermore, calls forwarded to these alternate destinations generally can not be supplied along with other services. For example, forwarded calls are not accompanied by indications which would be useful to the intended recipient in the event that party is currently busy on another call; e.g. by call waiting and/or caller ID indications that would enable the intended recipient to screen forwarded calls and selectively accept and reject such calls.

It has been suggested previously to use computers linked to AIN intelligence, rough the Internet or web, to vary parameters of telephone services (reference the co-pending application by J. M. Dunn et al, cross-references 3 and 4 above). But services associated with such varied parameters are generally standard services, rather than extended services within the present context of definition, and would be deliverable with limited flexibility in respect to combined use of other services (e.g. a forwarded call generally would not be combinable with a standard but reroutable form of call waiting and/or a standard but reroutable form of caller ID).

Similarly, a standard service like "call waiting" can be administered (enabled and disabled) for individual calls originating at a line associated with a base telephone account (e.g. by dialing or tone signalling the characters "*70" before entering other characters representing a called number. It has been suggested to allow for this type of service to be subject to administration through an external network such as the web or Internet, so that the term of enablement or disablement could be varied for more than a single call (refer to Dunn et al cross-reference 3 above), but without altering the essential context of delivery of such service; i.e. the service, when enabled, would be delivered in a standard form and context, and appear as such to the recipient of the service.

Our discovery in this regard is that it could be useful to provide telephone services in a non-standard context; for example, to provide call waiting indications to a computer, through an external network such as the web or Internet (e.g. as data signals causing visible blinking of a "call waiting" icon in e.g. a computer browser display, or audible clicks prompted by the respective browser application), where the respective indications connote a waiting call on a telephone line which may or may not be separate from a line connecting the computer to the external network. Examples of how this could be useful would be: 1) to make a PSTN user operating remote from a home or office instantly aware of telephone call activity at the respective home or office; 2) to make a computer user linked to a data network such as the web, through a home or office telephone line used for standard telephony, instantly aware of telephone call activity being directed to that line.

Similarly, a standard service like caller ID has no present "extended" counterpart for delivery by the PSTN through external networks.

Considering just extended counterparts of standard call waiting and standard caller ID, we have recognized/ discovered that such counterparts would have utility in terms of. 1) enabling a PSTN user at an online computer (a computer actively connected to the web or Internet, e.g. through a telephone line) to become instantly aware of and screen the importance of waiting telephone calls that are directed to a telephone line associated with a base account; and 2) that this type of function could be important whether the telephone line to which the waiting calls are directed is separate from or coincides with a telephone line through which the computer's current web connection is being made. Furthermore, our discovery in this regard is that such extensions of call waiting and caller ID service could be used in conjunction with a variation of call forwarding service (what we presently call "extended call transfer") to allow the recipient of the the extended call waiting and/or caller ID services to selectively accept waiting calls and have them redirected to the recipient's computer (e.g. via an Internet Phone application in the computer) without altering the online status of the computer.

Those skilled in the art will immediately appreciate, from these examples, and from the descriptions to follow that there are many other existing or potentially useful telephone services that could be beneficially "extended" in this manner.

SUMMARY OF THE INVENTION

The present invention seeks to broaden service options available to authorized users of base telephone accounts as defined earlier, by providing "extended" telephone services which may but need not necessarily be variations of existing standard telephone services (refer to earlier definitions of both standard and extended services). Existing standard services and other forms of telephone services having potential for extension in the manner presently contemplated will become readily apparent from what is to follow. The invention also seeks to provide a service capability for resource management intelligence in the PSTN that expands the type and character of services that may be provided to PSTN customers and other authorized users.

In accordance with the invention, extended telephone services are made available to authorized users of base telephone accounts in the PSTN, through networks external to the PSTN (e.g. the web and Internet). Extended telephone services of the type presently contemplated may be variations of standard telephone services that are currently provided in the PSTN or functions having no present counterparts in existing telephony. However, extended services generally are characterized in that they are deliverable through networks external to the PSTN.

Presently contemplated extended telephone services are provided to authorized users of base telephone accounts (i.e. individuals whose status as authorized users are subject to authentication by the PSTN prior to delivery of respective services). These services generally involve communications under PSTN control through networks external to the PSTN, and they are implementable by adaptations of resource management intelligence in the PSTN (either existing intelligence or intelligence installed hereafter); typically, by intelligence presently responsible for managing delivery of standard telephone services combined with means interfacing such intelligence to networks external to the PSTN.

Typically, and preferably, this type of resource management intelligence is exemplified by "voice peripheral" (VP) processors of the type disclosed by Acker et al (cross-referenced application number 1 above) although other types of processing components may be used. VP's and other processors are discrete components of multiprocessor intelligent peripheral (IP) systems used at regional telephone switching nodes of the PSTN. In the configuration taught by Acker et al, processors of an intelligent peripheral subsystem have specialized responsibilities, and VP's are responsible for managing administration and delivery of telephone services. In a preferred implementation of presently contemplated extended services, a server within an IP system, at a PSTN node directly serving base accounts within a predefined geographic region, interfaces the respective node to a network external to the PSTN (e.g. the web, Internet, satellite radio system, etc.), and cooperates with a VP in the same IP system to perform functions administering such services and delivering them to authorized users of the base accounts; such functions including communicative interaction with the authorized users through the external network.

For example, delivery of an extended version of todays "standard" call waiting service through the web would involve transfer of call waiting signal indications between a switch port within a PSTN node directly administering that service and a (multimedia) computer connected to a PSTN server at the respective node via the web; with the computer equipped with a state-of the-art web browser. The computer may be connected to the web through a telephone line, and that line may be either separate from or coincide with the line to which the waiting calls are originally directed. Call waiting indications presented at the computer could be either visible (e.g. a blinking icon) or audible (e.g. "clicking" sounds). In this operation, telephone call signals directed to a telephone line associated with a base telephone account, and presented in standard fashion at a switch port in the region serving that account, are intercepted by e.g. VP intelligence administering the account and signals representing call waiting indications are routed to the (authorized) user of the account through a local PSTN server, the web, and the user's computer. The resulting "extended call waiting" indications, when used together with other extended services given below as examples, enable a user to screen waiting calls, ignore unimportant ones, route moderately important calls to an "extended voice mail" service (allowing the caller to record a message for later delivery via the web) and immediately accept delivery of most important calls (e.g. via a presently state-of-the-art Internet Phone type of software application).

Another example of extended service, of a type presently contemplated and useful in association with "extended call waiting", is extended "caller ID". In this service, signals indicating origins of waiting calls to a base account telephone line, are redirected to an authorized user's computer via the web and displayed to the user on the computer's monitor. The displayed indications enable the user to screen calls and rank their relative importance or urgency. Another example of extended service, useful in conjunction with extended call waiting and extended caller ID, is extended call transfer. In extended call transfer, an authorized user of a n associated base account accepts a waiting call, the accepted call is connected to the user's computer (through the PSTN server, the web and the user's "online" computer) and the voice signals of the accepted call are converted to suitable forms; signals directed from the PSTN to the web being converted to a compressed digital form suited to web transmissions, and signals from the web to the PSTN being converted e.g. to an analog form suited to transferral through a PSTN switch port to a calling party.

Another example of extended service in accordance with this invention, termed "extended fax transfer", is useful to route facsimile signals generated by standard analog equipment to an "online" computer of an authorized user of the service, via the web. In this operation, signals representing the originally transmitted image are converted (e.g. by a VP) to a digital form best suited to presentation at an online computer, e.g. to an HTML (Hypertext Markup Language) format of the type now widely used by computer web browser software. Thus, the received image could be selectively viewed, stored/downloaded for later viewing, and printed as any other web page material. This enables the user of the service to use their online computer to receive such images, in lieu of analog fax reception equipment and/or fax modem software (such software not being as simple to use as extended fax transfer, while a computer is actively connected to the web).

Another example of extended service, termed "extended voice mail", provides users of the service with an option to have waiting telephone calls (e.g. calls screened by extended call waiting and extended caller ID) routed to a voice mail facility in the PSTN, for recording of a message and later delivery of the recorded message via the external network (e.g. the web). Thus, a user of this service could receive recorded voice mail messages through the web by means of a computer and an Internet Phone software application. This type of service could be easily extended to deliver other audible recordings to appropriately equipped computers linked to the PSTN via the web (that is recordings other than voice mail messages; for instance, recordings of educational materials and the like).

In all of the foregoing examples of presently contemplated extended services, the user of the service can be effectively anywhere in the world in relation to a (home or office) telephone line associated with a base account, even at a geographic location not directly served by the PSTN (e.g. in a remote region having only satellite linked radio facilities not directly maintained by the PSTN), and the services are receivable at devices other than standard telephone instruments (e.g. at computers connected to the web or Internet).

Other extendable telephone services—both variations of existing standard telephone services and services rendered practical solely by virtue of the extended usage presently taught—will readily occur to those skilled in the telephony management arts.

To provide for presently contemplated extended telephone services, computer components of resource management networks within the PSTN—particularly, voice peripheral (VP) computers that are components of intelligent peripheral (IP) systems within resource management networks constructed in accordance with well-known principles of Advanced Intelligent Network (AIN) architecture—are adapted (e.g. programmably) to interface between switch ports within the PSTN and networks external to the PSTN (e.g. the web, Internet, satellite radio systems, etc.), and to perform administrative and signal transfer functions requisite to respective services. These functions will be understood from the description to follow. IP systems containing VP computers and other computers as components are described in the Acker et al application of cross reference 1 above. In such IP systems, VP computers have specific responsibility for provision of telephone services at regional geographic nodes in the PSTN, and other computers have specific responsibilities for management of telephone call traffic and other telephony processes at the same nodes.

The foregoing and other features, benefits, advantages and potential uses of the subject invention will be more fully appreciated from the following description.

BRIEF DESCRIPTION OF THE DRAWINGS

FIGS. 7a to 7g, considered together, constitute a flow diagram showing details of implementation of extended call transfer service.

DETAILED DESCRIPTION

Figures 1, 2:
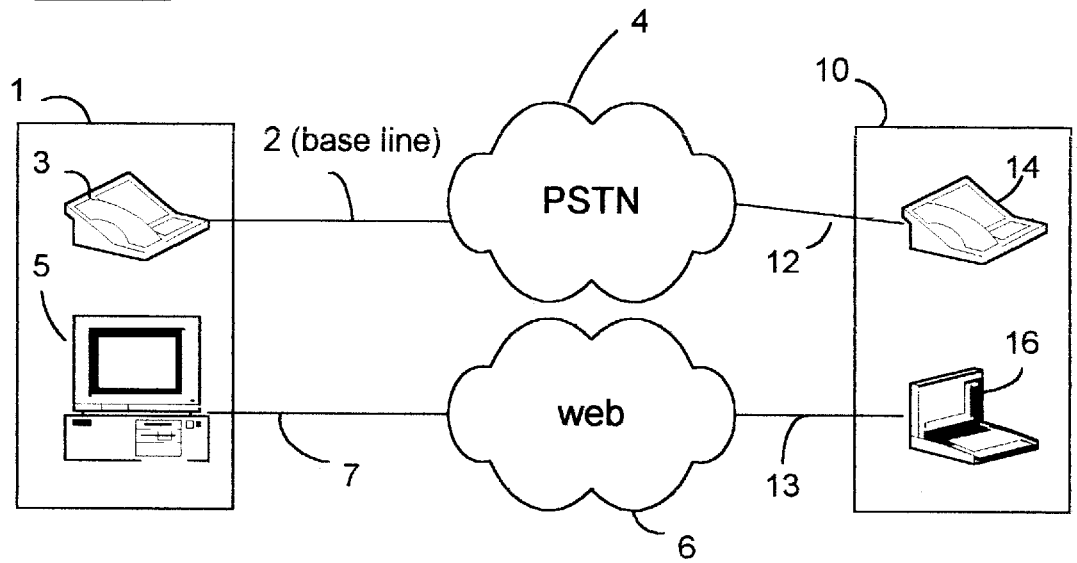
FIG. 1 is a schematic for explaining a PSTN need presently provided.
FIG. 2 is a chart contrasting functional capabilities of PSTN resource management intelligence with and without the present invention.

Presently conventional usage of the PSTN and networks external to the PSTN (e.g. the web) is suggested in FIG. 1, and the chart in FIG. 2 is used to explain how such usage pertains to PSTN services (call waiting, call forwarding, etc.). These figures are used to illustrate the problem discovered and resolved presently.

User premises 1 (office, home, etc.) connects to a telephone line 2 associated with a base telephone account as defined above. Premises 1 are normally occupied by an authorized user of the base telephone account. Hereafter, a telephone line such as 2 that is used by an authorized user of a base telephone account may be referred to as a base telephone line (or simply a base line). Base line 2 connects to analog telephone equipment 3 at one end and PSTN 4 at its other end. Telephone equipment 3 may be a simple voice telephone, facsimile communication apparatus, or a combination of voice telephone and facsimile communication apparatus. Computer 5, housed in premises 1, connects to external data communication network 6 (shown as the web) through line 7. Line 7 can be either a telephone line maintained by the PSTN or part of a private local or wide area network (LAN or WAN) having direct connections to the web. If line 7 is a telephone line, it can either share use of base telephone line 2 with telephone equipment 3 (i.e. enabling computer 5 to get online only when telephone 3 is idle, and allowing telephone equipment 3 to use line 2 only when the computer is offline). If line 7 is a telephone line separate from line 2 (e.g. an additional line paid for by the owner or tenant of premises 1), computer s can be online while telephone equipment 3 is in use (off-hook).

Continuing to refer to FIG. 1, PSTN 4 and web 6 may connect to remote premises 10, via lines 12 and 13 (either physically separate or used in time separation). Thus, line 12 may connect to analog telephone equipment 14 in premises 10, and line 13 may connect to computer 16 in the same premises. Line 12 may be a base telephone line for telephone users in premises 10. Line 13 may be a telephone line (one maintained by the PSTN) or a part of a private network external to the PSTN (e.g. a line connecting to a local or wide area private network). If line 13 is a telephone line coinciding with line 12, telephone equipment 14 can not be used while computer 16 is online and computer 16 usually will be unable to connect online while equipment 14 is in use (off-hook).

For purposes of the discussion to follow, premises 10 also may be viewed as a place temporarily used by an authorized user of line 2, while the latter is on a business trip (e.g. a hotel room in a city or country geographically remote from the city or country containing premises 1), and computer 16 may be viewed as a portable (e.g. laptop) computer carried by that authorized user on the trip. However, it will be appreciated, as this description progresses, that extended services of the type presently contemplated can be provided to computers that are either remote from or within premises such as 1, can even be usefully furnished to the computer 5 shown in FIG. 1, and may even be usefully provided to the computer 5 while that computer is linked to the web through base telephone line 2.

As suggested in block 20 of the chart in FIG. 2, without the presently contemplated adaptation (of PSTN intelligence responsible for management of telephone services), telephone services assigned/charged to base line 2 are confined exclusively to the PSTN. Therefore, services constituting "extensions" of assigned telephone services could not be routed through external networks such as the web.

As an example, if telephone lines 2 and 12 of FIG. 1 have "standard" call forwarding service assigned to them (standard connoting call forwarding service of the type presently provided by the PSTN), telephone calls directed to either telephone line could not be redirected through the web (or another external network) to either a computer or another telephone. That is, calls directed to line 2 by internal switches of the PSTN could not be forwarded by the PSTN to either a remote computer such as 16 or a local computer such as 5 while such computer is linked to the web. Furthermore, a telephone call directed to line 2 could not be forwarded even to another telephone (e.g. telephone 14) if such forwarding required routing of the redirected call through the web.

Implied by the foregoing statements, and suggested explicitly in FIG. 1, computers such as 5 and 16 can communicate through the web with each other and with other computers anywhere in the world; but such communications are carried out in a context wherein telephone services furnished by the PSTN have no extended application to processes performed in these computers while communicating in this fashion.

Block 22 in FIG. 2 indicates that with the presently contemplated adaptation (of PSTN intelligence), extended forms of telephone services presently provided within the PSTN can be furnished to equipment linked to networks external to the PSTN; e.g. to computers linked to the web. Types of extended telephone services that can be provided in this manner, and preferred implementations thereof, are described next.

Figure 3:
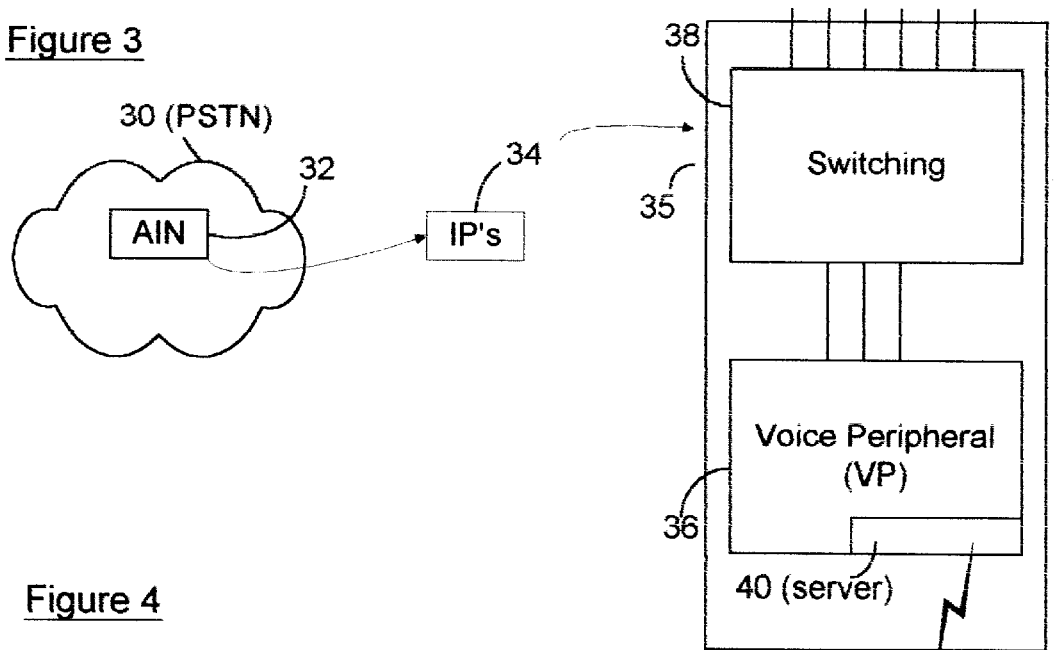
FIG. 3 is a schematic of a preferred system environment for implementation of the present invention.

FIG. 3 schematically illustrates resource management intelligence of the PSTN, configured in accordance with the distributed architecture disclosed in the application by Acker et al cross-referenced above. System complexes embodying such intelligence are located at regional nodes of the PSTN. Each (nodal) complex comprises a network of computers and switching gear configured in conformance with architectural principles of Advanced Intelligent Network (AIN) construction that have been widely adopted by telephone companies operating within the PSTN.

In FIG. 3, the PSTN is indicated at 30, and an AIN complex within one of its regional nodes is represented at 32. AIN complex 32 contains an intelligent peripheral (IP) network indicated at 34. In general, as described by Acker et al in their copending application cross-referenced above, an IP network such as 34 comprises multiple processors intercommunicating through a network (e.g. a local area network or LAN privately maintained by the PSTN). The processors of the network have distinct functional responsibilities; call traffic routing being a principal responsibility of processors designated "call processors" and delivery of telephone services being a principal responsibility of processors designated "voice peripherals" (VP's) which are relevant to the delivery of presently contemplated extended telephone services.

As suggested at 35, network 34 contains one or more VP processors 36, communicating with a switch complex 38, (not shown) call processors, and a server processor 40. As shown at 42, server 40 connects to networks external to the PSTN (e.g. the web, the Internet, cable TV networks, etc) and may be referred to hereafter as the PSTN's "web server". Server 40 can be either a separate processor (separate from the VP's and call processors) or a shared part of one or more VP's 36.

Figure 4:
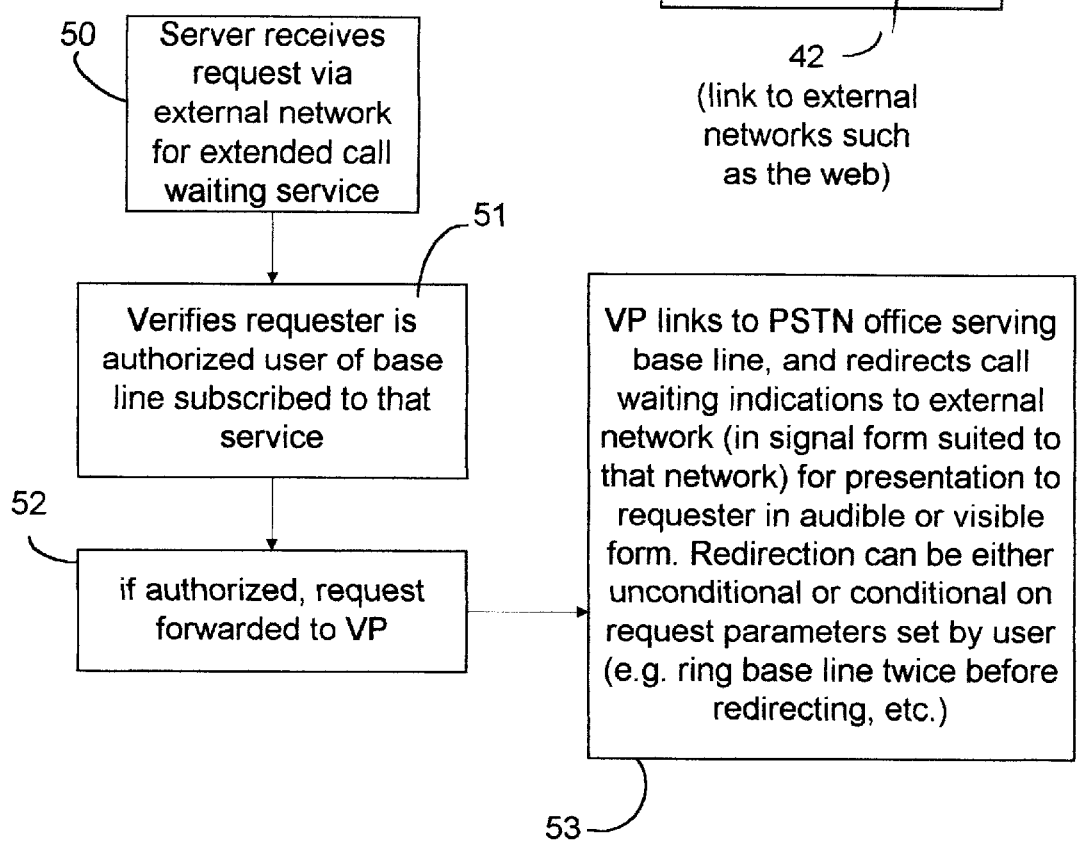
FIG. 4 is a high level flow diagram illustrating how the system of FIG. 3 can be functionally adapted to provide extended call waiting services of this invention.

FIG. 4 shows how the subsystem 35 of FIG. 3 can be functionally adapted to provide a particular type of extended telephone service—termed "extended call waiting"—that exemplifies a species of a genus of extended telephone services contemplated by the present invention. Other species of extended services are described later. In the example of call waiting service described next, it is assumed that a PSTN server such as 40 is linked to the web and that it and a VP such as 36 are specially adapted (e.g. have specially written program applications) for performing functions described next.

Extended call waiting is a type of service that is chargeable to a specific base telephone account associated with a specific base line such as line 2 (FIG. 1). Extended call waiting is a variation of standard call waiting (the standard service presently provided in the PSTN), but the extended version differs from the standard one in that is delivered only to authorized users of base accounts, usually through external networks such as the web, and in the latter circumstance usually through a server such as 40 that is part of an IP network or equivalent resource management intelligence within the PSTN.

All other presently contemplated extended services have similar usage; i.e. they are deliverable only to authorized users of base accounts, and generally via external networks and IP servers or equivalent elements of PSTN resource management intelligence.

Considering the web, delivery of extended call waiting service (and other extended services) generally will be initiated when a user of a "browser-equipped" computer signs on to the web and accesses a predetermined URL (Uniform Resource Locator) maintained by a PSTN web server. Typically, the URL would be pre-assigned to authorized users of base accounts within the local geographic region managed by the IP network (or equivalent intelligence) containing the server. At such times, a web page will be presented to the web user requiring the user to enter specific self-identification information. This information is forwarded to the web server, enabling the latter to verify that the web user is an authorized user of a base account within the server's local region. This verification process is suggested in block 51, FIG. 4.

If the web user is found to be an authorized user of a local base account, another web page is sent from the the web server to the user indicating, among other things, extended service options available to that party. One such indication may denote availability of extended call waiting service. If extended call waiting is an available option, it can be activated by the web user (e.g. by "clicking" on the respective indication).

Web pages and indications consistent with the foregoing are presently state of the art for other web (and Internet) activities (i.e. activities other than accessing telephone services). When extended call waiting is activated, the server signals that occurrence to a VP responsible for delivery of the respective service (block 52, FIG. 4). The VP then communicates with local switching centers (e.g. 38, FIG. 3) to determine when a new telephone call is being directed to the base telephone line associated with the web user's base account. When a new call is found the switch port at which the call appears is recorded by the VP and extended call waiting signals are sent to the web user via the web server. These signals are digital signals causing a call waiting indication (either visible or audible) at the web user's computer (block 53, FIG. 4).

For reasons which will be explained later, an acceptance indication (usually visible) is also provided to the web user for enabling the latter to selectively signal acceptance of the waiting call (to the VP via the web server). The acceptance indication is generally used in conjunction with other extended services discussed later (extended caller ID and extended call transfer).

The web user's extended call waiting service may be delivered either unconditionally or subject to conditions stipulated by the user (block 53, FIG. 4). Usually, the conditional version would be used when the web user is operating remote from the premises containing a respective base telephone line, and the unconditional version would be used when the user is linked to the web through the base telephone line to which incoming calls would be directed. A representative condition suggested in block 53, FIG. 4, is to apply a predetermined number of rings to the user's base line and if the line remains inactive (the waiting call is not picked up there, e.g. by a co-occupant of the premises connected to that line) the extended indications are routed to the user through the web.

Figure 5:
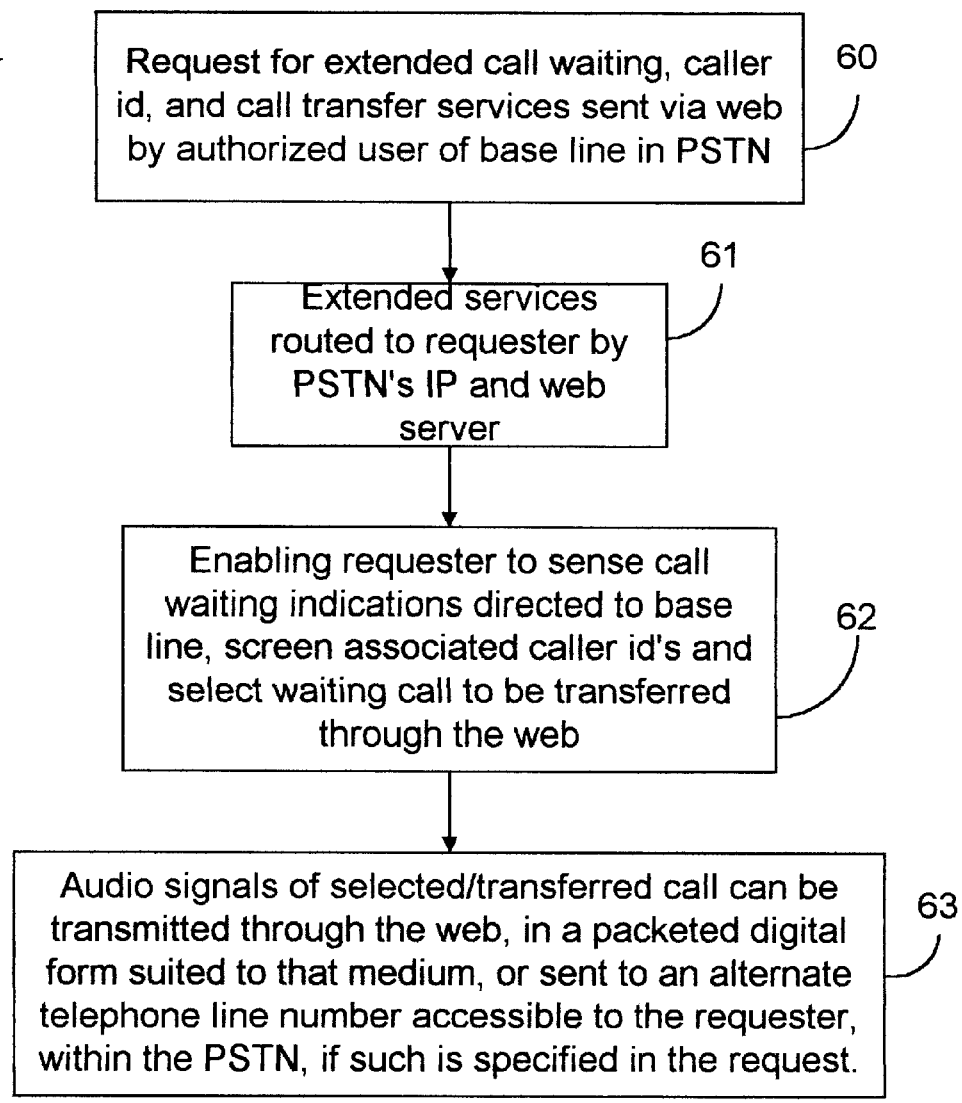
FIG. 5 is a high level flow diagram similar to that of FIG. 4 illustrating how the system of FIG. 3 can be adapted to provide multiple inter-related extended services.

FIG. 5 shows how the foregoing extended call waiting service can be used with particular advantages in conjunction with other extended services; specifically, in conjunction with "extended caller ID" and "extended call transfer" services. The extended caller ID service would enable its recipient to screen origins of waiting calls indicated by extended call waiting, and extended call transer would allow the recipient to accept selected/screened calls and have the selected calls routed to the recipient's computer (of course, via the VP, PSTN web server and web).

In effect, extended caller ID, as presently contemplated, corresponds to standard caller ID (in which indications of waiting call origins are furnished to a telephone (analog or other) connected to a base line; but with the difference that it is delivered rough an external network by means of intelligent rerouting actions of IP intelligence and a (web) server in the PSTN. Call origin indications delivered by extended caller ID are displayable directly at a computer linked to the web (i.e. they do not require any additional equipment, in contrast to equivalent indications of standard caller ID).

Extended call transfer, as presently contemplated, is similar in functional effect to standard call forwarding; but where calls rerouted by standard call forwarding are delivered to an alternate telephone number, which needs to be pre-specified by the user of the service, calls accepted with extended call transfer are routed to an online computer whose location is immaterial to the call route. In other words, where calls forwarded with standard call forwarding can incur distance charges and the like, calls rerouted by extended call transfer are treated the same whether their destination is local to or geographically remote from a respective base line. Another difference in extended call transfer via the web is that the signals of the transferred calls are converted between analog and compressed digital formats, the former typical of call signals usually handled within the PSTN and the latter typical of signals transmitted over the web.

Noting that a request for extended services, as presently contemplated, can apply to one or more services, block 60 in FIG. 5 illustrates an exemplary situation wherein an authorized user of extended services acts through the web to activate all three of the foregoing extended services (block 61, FIG. 5). Verification by the server that the user is an authorized one is implied but not explicitly stated in block 60.

In this situation, when the web user signals acceptance of a waiting call, subject to the screening afforded by extended caller ID, the accepted call is intercepted at a PSTN switch port and redirect to the web user (blocks 62–63, FIG. 5) by coordinated operations of IP intelligence and a web server in the PSTN. As suggested in block 63, audio signals of the redirected call can be transmitted trough the web in a packeted (compressed) digital format traditional to that medium. Although not stated in this block, it is generally understood that audio signals in that form are convertible within a computer by an Internet Phone application; there being a number of such applications presently available commercially. Block 63 also suggests that the web user can be given an additional routing option, in respect to call transfer, wherein the extended service is handled as a standard call forward; i.e. the web user can provide the IP intelligence with the number of a telephone nearby and have the call routed as an analog call to that telephone (for example, a web user operating in a hotel room with two lines can use one line for web access and the other as a destination for forwarded calls).

Figure 6:
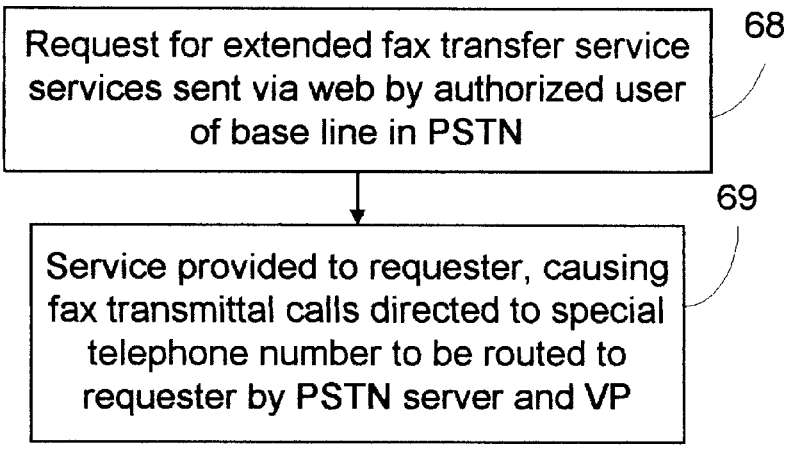
FIG. 6 is a high level flow diagram of an extended "fax transfer" service representing a variation of an extended "call transfer" service shown in FIG. 5.

A variation of extended call transfer service, presently termed extended fax transfer, is suggested in FIG. 6. Authorized users of this service would be given a special telephone number within their local call region (e.g. a number associated with a special base account dedicated to the service), and furnish that special number to parties desiring to communicate facsimile materials. The authorized user could then access the PSTN web site, as for the other extended services, and indicate/request activation of a fax transfer option after having been identified as an authorized user of such (block 68, FIG. 6).

When a facsimile call is directed to the special number, the call is intercepted and routed to the authorized user's computer (on the web), the interception and routing being performed by IP intelligence and a web server in the PSTN (block 69, FIG. 6). In this instance, it is understood that the signals sent to the web would be converted to a compressed digital form compatible with that medium and either immediately displayed and printed or saved at the receiving computer. It also should be understood that an authorized user of this service need not have any special facsimile receiving equipment in addition to a computer (i.e. this could be an economical service for a web user who does not have a special purpose facsimile receiver). It also should be understood that the re-routed facsimile image can be converted to HTML (hypertext markup language) format now traditionally used for displaying web page materials (by the IP intelligence in the PSTN), so that the material is presented to the authorized user in the pleasing form associated with that format A contemplated variation or option for this extended fax transfer service would be that if calls are waiting at the special number, but the authorized user is not currently on-line, the image could be saved by the IP intelligence (VP) as a form of web e-mail and presented to the authorized user when the latter signs on to the appropriate PSTN web site. Other variations of this options will readily occur to those skilled in the relevant arts.

In respect to each of the foregoing examples of extended service handling, it should be understood that the request for such service(s) can originate anywhere in the world, since the web is ubiquitously accessible everywhere; e.g. at a computer in a city or country remote from the requester's base line premises (e.g. premises 1, FIG. 1), at a computer within the requester's base line premises, and even at a computer that is actively connected to a web/Internet access provider through the respective user's base telephone line.

Details of operations required to deliver the foregoing extended services are understood by considering the following discussions of FIGS. 7a to 7g and 8. It is understood that such operations are performed cooperatively by a VP (voice peripheral) such as 36 and server such as 40 (FIG. 3) or equivalent intelligence of the PSTN (e.g. other elements of an intelligent peripheral of a type required by AIN architecture). It is understood further that the operations to be described usually will be performed at a regional node in the PSTN locally maintaining the base telephone account of the party receiving the respective extended service.

FIGS. 7a to 7g considered together constitute a flow diagram of operations involved in delivery of extended call transfer service. In this service, telephone calls directed to a base telephone line are conditionally rerouted to the user via the web and appropriate application software on the user's computer (e.g. any of today's commercially available "Internet Phone" type applications).

Operations described in this diagram are considered also to be representative of operations required for delivery of extended call waiting and extended caller ID services that are useful for screening calls selected for extended call transfer as explained earlier.

FIG. 7a illustrates operations performed when a party on the web logs on to a PSTN web server (the latter representing the web interface maintained by the PSTN for that party's base telephone account). As noted earlier, the party logging on accesses a web (or Internet) "home" (or starting) page maintained by a PSTN server in the local telephone calling region normally serving that party (operation 80, FIG. 7a). The home page contains selectable entries (e.g. hyperlinked text selectable by clicking a mouse cursor on them), these entries effectively constituting (or referencing) a form which the logging party completes for identification purposes. Using the entered information, the (PSTN's web) server verifies that the party logging on is an authorized user of a base account within the geographic jurisdiction of the server and the VP handling the service (operation 82, FIG. 7a). Although not stated explicitly, it is understood that if the party is not an authorized user further access to PSTN functions is denied. It is also understood implicitly that in this particular instance, the party logging on has effectively indicated acceptance of one or more waiting calls to be connected via extended call transfer service. It is understood also that the verification operation suggested at 82 requires the server either to have a copy of the database of local PSTN authorized users or to communicate with other elements of the respective AIN network to obtain the needed information. Finally, it is understood that the logging party may be anywhere in the world in relation to the local region served by the VP and web server handling the extended (call transfer) service.

After verifying that the logging party is an authorized user of a base account entitled to extended call transfer service, PSTN intelligence (in this instance, the VP responsible for delivery of telephone services to the base account) monitors switching centers within the local region for new telephone calls directed to the base telephone line (at home, office or mobile phone associated with the base account) of the respective authorized user (decision/action point 84, FIG. 7a). If no such new calls are pending, the VP and server effectively idle, while the web party's (authorized user's) computer receives a page image indicating extended services, including extended call transfer, currently being provided to that user (86, FIG. 7a). If a new incoming call to the user's base line is detected ("yes" exit from action point 84), the call information handling process starting at 90 (FIG. 7b) is evoked.

In the latter process, the PSTN intelligence checks to make sure that the user of extended call transfer service is still online (still connected via the web to the PSTN's web server) as suggested at 92 (FIG. 7*b*). If the user has disconnected from the web server at this time, standard ringing and call connecting operations 94 are performed relative to the user's base line. That is, the base line is rung until either the call is answered (a conventional telephone or telephone answering device goes off-hook) or the incoming call is terminated (caller hangs up). An additional standard voice-mail option, suggested by actions 96 and 98, routes the incoming call to a centralized voice mail facility maintained by the VP handling the services after a predetermined number of unanswered rings ("ring count") have been applied to the base line. In this option, if the number of unanswered rings to the base line is equal to or less than the predetermined number ("no" exit at decision 96), the base line ringing process continues, but when the ring count is exceeded ("yes" at 96) the standard voice mail function is initiated (action 98) with delivery of a recorded announcement to the calling party and opportunity given to that party to leave a voice message. The message is deliverable to the end user of the service either as a standard service function, connected to the user's standard telephone equipment through lines entirely internal to the PSTN, or as an extended voice-mail service function deliverable to the user via the external network and equipment linked to that network.

Returning to consideration of decision action 92, if the authorized user is still online when the incoming call is detected ("yes" at 92), continuing call processing functions are evoked (refer to FIG. 7*c*) starting at 100. In this stage of call handling, PSTN intelligence in the user's local service region (e.g. the VP) determines if the user has stipulated conditions on delivery of the extended call transfer function; e.g. a requirement to have a predetermined number of standard rings applied to the user's base line before the call is routed to the user through the web.

Figure 7C:
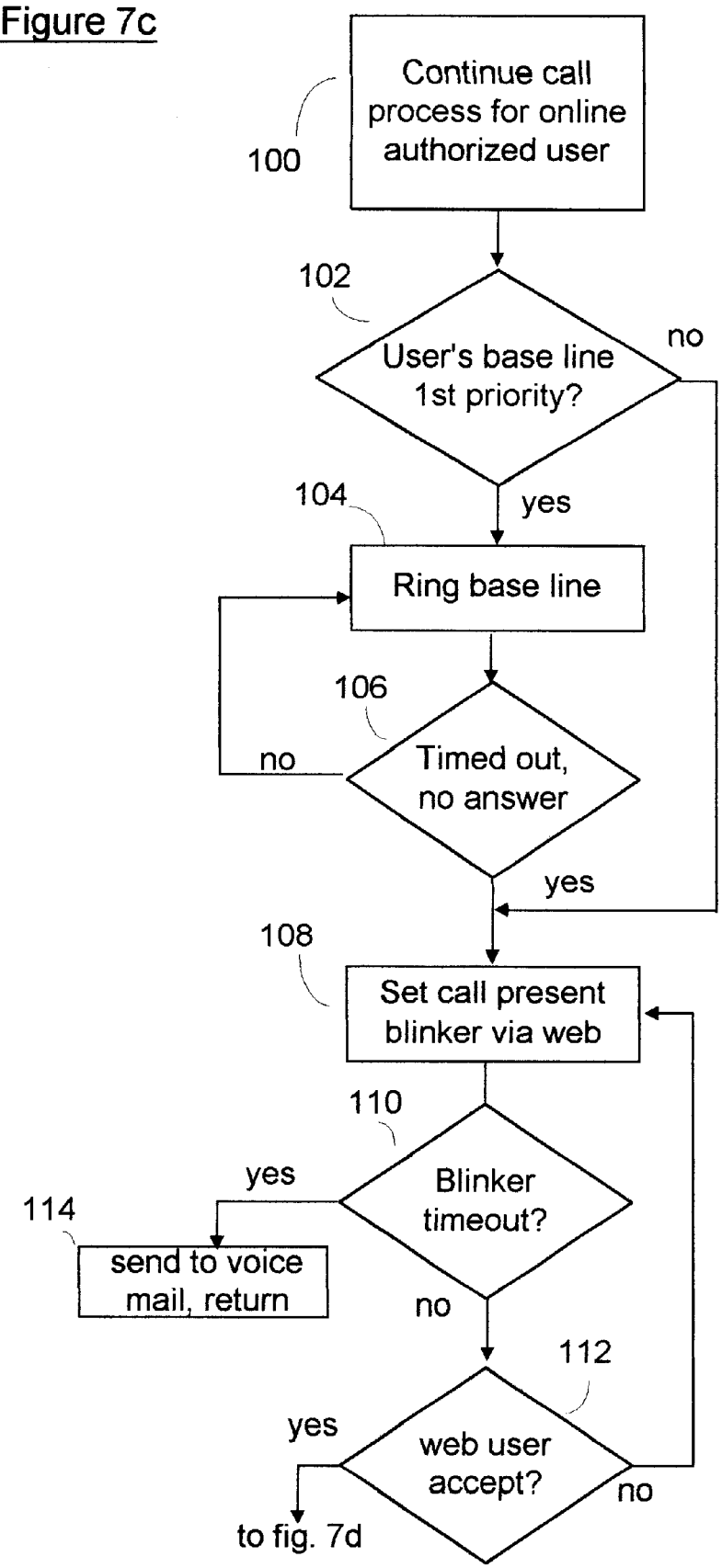

If local ringing conditions are applicable ("yes" at decision 102, FIG. 7*c*), the local base telephone line is rung until either the call is locally answered at the base line (by a conventional telephone device going "off-hook") or a limit number of local rings pre-specified by the user have been applied (actions 104, 106 FIG. 7*c*). If local conditions are either inapplicable ("no" at 102) or have been fulfilled without a standard local response ("yes" at 106), a "call present" indication is given to the user's computer via the web as shown at 108. This indication can be provided e.g. in the form of a blinking "call present" icon on the user's computer monitor as shown. What happens next is up to the user and indicated by decision functions 110 and 112.

If the blinker function has not timed out ("no" at 110 and the user has not accepted the call ("no" at 112), the blinker presentation continues. If the "blinker" function times out without action by the user ("yes" at decision 110), application of extended call transfer service to the waiting call may be discontinued. An additional service option, suggested at 114, routes the incoming call to a PSTN voice mail service, after the blinker timeout. On the other hand, if the user accepts the incoming call ("yes" at 112, manifested e.g. by the user clicking a mouse button while pointing to the blinker with the latter having a hyper-linked association to "waiting call" acceptance), the call interception and conversion/streaming process starting at 120 in FIG. 7*d* is evoked by the PSTN intelligence.

Figure 7D:
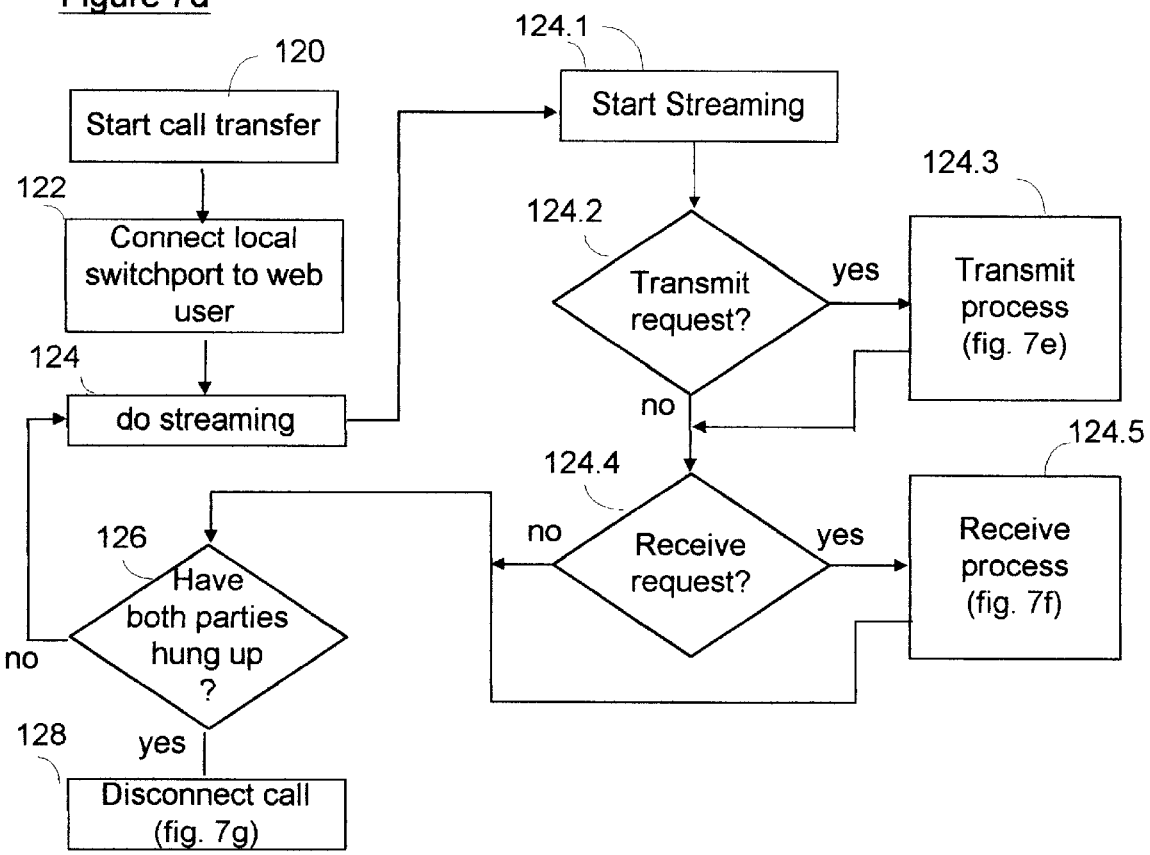

In this process, a call connection is established between the calling party and the called party/authorized user (action 122, FIG. 7*d*). This connection generally runs through a port on PSTN switches ("switch port"), the VP or other PSTN intelligence, the PSTN web server, the web and (a telephone call handling application in) the authorized user's computer. With the connection established, the conversion/streaming process is initiated at 124 (FIG. 7*d*) to convert analog voice signals from the caller to a compressed digital form suited to web transmission and to convert voice signals from the called party, in compressed digital form, to an analog form appropriate for transferral to the caller through the PSTN switch port This conversion/streaming process—indicated at 124.1 to 124.5 in FIG. 7*d*—continues until both parties have hung up. Monitoring for that occurrence is at decision action 126 FIG. 7*d*. If one or both parties are still connected ("no" at 126) the streaming process continues via actions 124 and 14.1 to 124.5. When both parties have disconnected ("yes" at 126) the conversion process ends (action 128) and a disconnection process is performed, the latter process shown in FIG. 7*g*.

The streaming conversion process begins at 124.1 FIG. 7*d*. This process has transmit and receive phases associated respectively with conversion of analog voice signals being transferred from the PSTN switch port to the authorized user via the web and conversion of digital voice signals being transferred from the authorized user to the PSTN switch port via the web. The transmit phase is indicated at 124.2 and 1243 (FIG. 7*d*), and the receive phase is indicated at 124.4 and 124.5 (FIG. 7*d*).

Figure 7E:
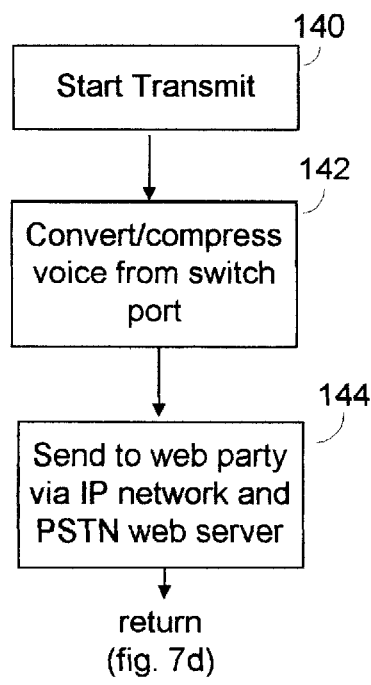

In the transmit process, the VP (or other PSTN intelligence) determines at 124.2 if a transmit request is active (i.e. if analog signals at the switch port have changed since their last sampling, conversion and web transfer). If a transmit request is not active, the receive phase is started at 124.4. If a transmit request is active, the transmit process 124.3 is performed. Details of the latter process are shown in FIG. 7*e* beginning at 140 in that figure. Analog signals at the switch port are sampled periodically (at a rate sufficient to be able to properly reproduce the voice), converted to digital form and saved cumulatively in that form (operations 142). When enough digital signals have been accumulated to complete a "packet" (usually, composed of hundreds or thousands of individual samples) they are sent to the server in a burst (i.e. time compressed) form and transmitted by the latter to the authorized user's computer via the web (operations 144).

Figure 7F:
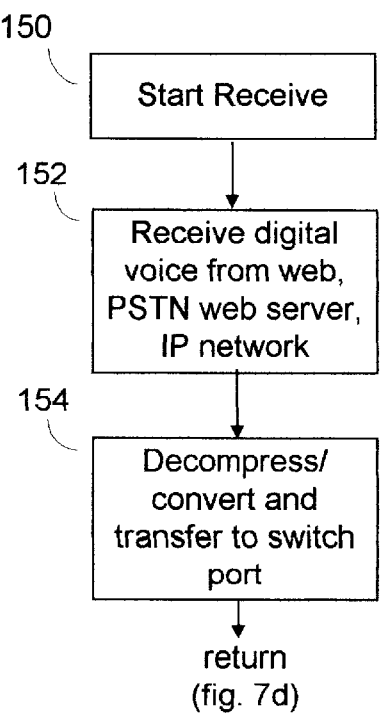

In the receive process, the VP (or other PSTN intelligence) determines at 124.4 if a receive request is active (i.e. if a packetized burst received from the web has not been fully converted, retimed and sent to the switch port). If a receive request is not active, action 126 is performed and the conversion phases are repeated if both parties have not disconnected. If a receive request is active, the receive process 124.5 is performed. Details of the receive process are shown in FIG. 7*f* beginning at 150 in that figure. Digital signals received from the web, representing time-compressed voice samples, are converted to analog form, retimed to uncompressed form and applied to the switch port in the last form (operations 152 and 154).

Figure 7G:
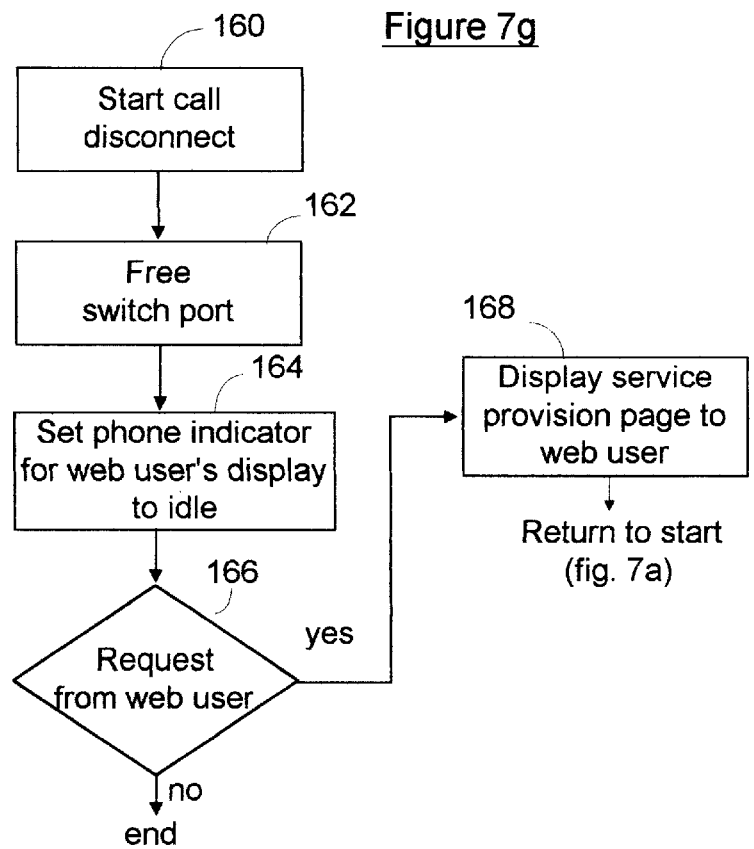

When both parties have disconnected ("yes" at 126, FIG. 7*d*) action 128 is taken to invoke the terminating process shown in FIG. 7*g*, starting at 160 in that figure. In this process, the switch port is feed up (i.e. rendered available for another call connection) as suggested at 162, and the authorized user's computer display is modified to indicate that the telephone call application at the computer is now idle (action 164). If the user is still connected to the web server ("yes" at decision 166), the initial page indicating the extended services currently active is displayed to that user (operation 168), and the processes described heretofore are repeated starting at FIG. 7a. It is understood that the page presentation indicated at 168 can be accomplished either by sending a full page to the user's web browser or by signalling the browser to restore a page previously cached in the user's computer.

It should be appreciated that the extended call waiting and extended caller ID services previously discussed can be performed by actions similar to but simpler than those described above; such actions serving to intercept analog signal functions representing activity at a PSTN switch port [in the case of extended call waiting, signal functions denoting one or more pending calls, and in the case of extended caller ID signal functions denoting origin(s) of (a) pending call(s)], and to transfer corresponding activity indications to the respective authorized user's computer in digital form via the web.

Figure 8:
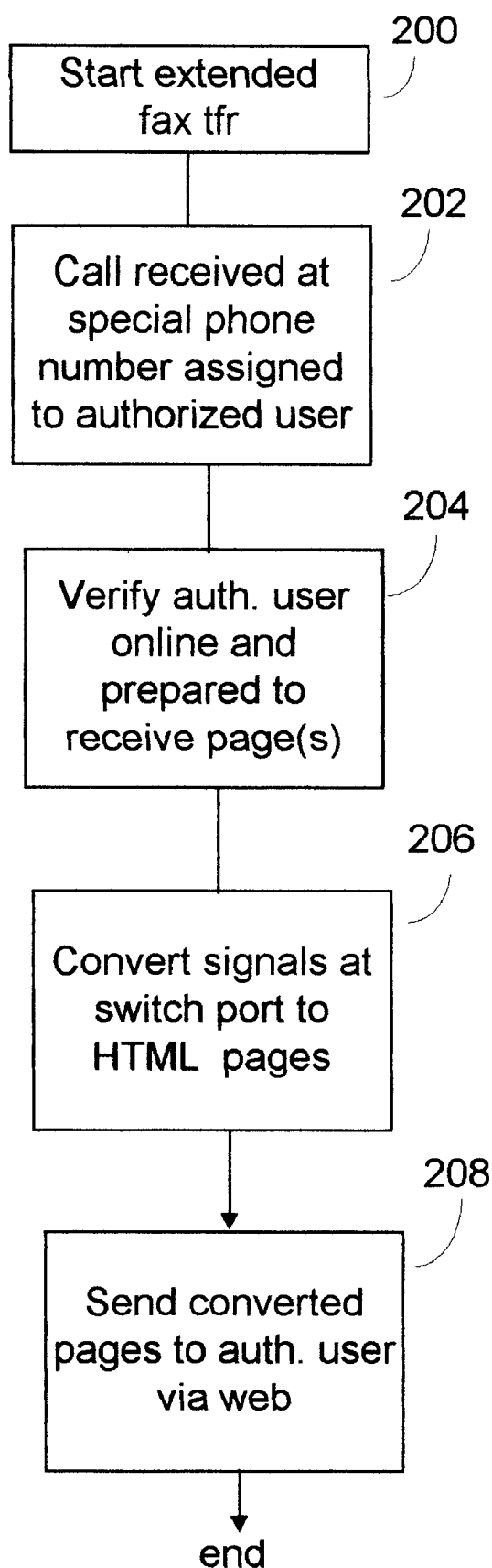
FIG. 8 is a flow diagram showing details of implementation of "extended fax transfer", a service suggested in FIG. 6.

FIG. 8 shows how the extended fax transfer service (suggested in FIG. 6) is implemented. This process, which starts at 200, involves receipt of a "local" telephone call to a special "local" telephone number preassigned to the authorized user of the service (operations 202), which number is given by that party to other parties desiring to transmit facsimile images to that user by means of ordinary analog facsimile transmission equipment. Although the reception of the call (detection of a ring directed to the special preassigned number) does not explicitly indicate to the PSTN that the call involves facsimile transmission, that fact is assumed when the call is detected.

When a call to such a special number is detected, the PSTN intelligence (e.g. VP) verifies that the authorized user of the respective service is online (actively connected to the PSTN's web server) and ready to receive web pages representing transmitted facsimile images (operations 204). Assuming that the user is online and ready, the incoming call is accepted by the PSTN intelligence and signals of that call are received, converted to a digital form, stored and eventually transferred to the authorized user via the web. The reception and conversion are indicated at 206 and the transfer to the authorized user is indicated at 208. As indicated at 206, the conversion may be used to change received signals (e.g. analog signals representing bit-mapped elements of a scanned image) to signals arranged in HTML (hypertext markup language) format generally used for presentation of web pages. Converted images can be sent (downloaded) to the user either as they are created or delivered at the user's request At the user's computer, downloaded images may be either immediately displayed or they may be stored (e.g. in cached hard disk files designated by the web server and the user's browser) and displayed at the user's request (by actions of only the user and the user's browser). Furthermore, stored images may be printed at a printer attached to the user's computer, by actions of only the user and user's browser.

In the foregoing process, images could be downloaded to and stored in the user's computer either in response to an explicit action by the user requesting the transfers, or as an automatic function not requiring action by (or presence of) the user during the transfers. Printing of transferred images is optional for the user, and also represents a method for creating hard copy images of transmitted facsimile which requires neither analog facsimile receiving equipment at the user's location nor a special facsimile application running on the user's computer (e.g. a state-of-the-art type fax modem application which might be difficult to use while the computer is connected to the external network).

What is claimed is:

1. For a telephone network constituting part of the public switched telephone network (PSTN), a system for delivering extended telephone services relative to a predetermined telephone line associated with a subscription to said extended services, said extended services involving interception and conditional redirection of telephone calls directed to said predetermined line, said conditional redirection serving to route said call to a destination specifiable by a subscriber to said extended services, said subscriber having an instantaneous connection to the PSTN, when said call is intercepted, through a data communication network external to the PSTN and a circuit path internal to the PSTN which excludes said predetermined line; said extended service delivering system comprising:

means internal to said PSTN for connecting resource management facilities of said PSTN to said authorized subscriber via said external data communication network and said internal circuit path excluding said predetermined line; and data processing elements internal to said PSTN, operating while said subscriber is connected to said resource management facilities, for: (a) instantly intercepting telephone calls directed to said predetermined telephone line before said calls can be applied to said predetermined line; (b) presenting information about each intercepted call instantly to said connected subscriber via said external network and internal circuit path; and (c) conditionally, at the direction of said connected subscriber, instantly redirecting said intercepted call to a destination other than said predetermined line; said other destination being instantly specifiable by said subscriber while said intercepted call is being processed by the PSTN;

said operations performed by said data processing elements being executable while said predetermined line is both idle (on-hook) and busy (off-hook).

2. An extended service delivering system in accordance with claim 1 wherein said internal data processing elements are adapted to enable said authorized subscriber to dynamically and variably specify parameters pertinent to conditional redirection of each said intercepted call to said elements while the respective call is being handled by said elements; said pertinent parameters including a number of unanswered ringing tones, specified by said subscriber, that are to be applied to said predetermined idle telephone line for the respectively intercepted call before the respective call is to be conditionally redirected to a said other destination, and a destination and condition for redirection instantly selected by said subscriber while the respective intercepted call is being handled by said elements.

3. An extended service delivering system in accordance with claim 1 wherein said authorized subscriber can be at a location geographically remote from said predetermined telephone line while having said extended services applied relative to said line.

4. A service delivering system in accordance with claim 3 wherein said processing elements are adapted to be able to redirect a distinguished facsimile call to said authorized subscriber via said external network, in response to a signal originated at equipment operated by said authorized subscriber, and to convert signals representing the facsimile information of said distinguished call to a digital form consistent with data transfer formats used in said external network.

5. An extended service delivering system in accordance with claim 1 wherein: (a) said internal processing elements are adapted for delivery of said extended services while said predetermined idle telephone line is connected to equipment for receiving both voice and analog facsimile signals; (b)

said internal processing elements are adapted to distinguish between a voice call instantly directed to said predetermined idle line and a facsimile call instantly directed to that line; and (c) said internal processing elements are able to indicate the distinguished type of call to said authorized subscriber without potentially compromising timing requirements of equipment originating a respective facsimile call.

6. A service delivering system in accordance with claim 1 wherein said processing elements are adapted to provide said authorized subscriber with indications that said predetermined line is in said idle state and that a telephone call is instantly being directed to that line, as well as an indication of the origin of the instantly directed call.

7. A service delivering system in accordance with claim 1 including means linking said processing elements to plural call switching centers of said PSTN, to allow for delivery of said extended services over a region encompassing multiple said switching centers.

8. A service delivering system in accordance with claim 1 wherein said subscriber links directly to said connecting means internal to said PSTN without dependence upon any specific service provider external to said PSTN for establishing said link to said internal connecting means.

9. For a telephone network constituting part of the public switched telephone network (PSTN), a system for delivering extended telephone services relative to a predetermined telephone line associated with a subscription to said extended services, said extended services involving interception and conditional redirection of telephone calls directed to said predetermined line to a subscriber authorized to use said extended services and having an instantaneous connection to the PSTN through a data communication network external to the PSTN and a circuit path internal to the PSTN which excludes said predetermined line; said service delivering system comprising:

means internal to said PSTN for connecting resource management facilities of said PSTN to said authorized subscriber via said external data communication network; and data processing elements internal to said PSTN, while said subscriber is connected to said resource management facilities, for: (a) instantly intercepting telephone calls directed to said predetermined telephone line before said calls can be applied to said line; (b) presenting information about each intercepted call instantly to said connected subscriber; and (c) operating conditionally, at the direction of said connected subscriber, to instantly redirect said intercepted call to a destination other than said predetermined line; said other destination being instantly specifiable by said subscriber while said intercepted call is being processed by the PSTN;

said extended service system characterized in that:

(A) said authorized subscriber can be at a location geographically remote from said predetermined telephone line while having said extended services applied relative to said line;

(B) said predetermined line is used to service both analog voice and analog facsimile calls, and said processing elements are adapted to be able to distinguish between voice and facsimile calls directed to said predetermined line, and to indicate the type of call so distinguished and the origin thereof to said subscriber without potentially compromising timing requirements associated with reception of information signals contained in said facsimile calls;

(C) said processing elements are adapted to be able to redirect a distinguished facsimile call to said subscriber via said external network, in response to a signal originated at equipment operated by said subscriber, and to convert signals representing the facsimile information of said distinguished facsimile call to a digital form consistent with data transfer formats used in said external network; and (D) said indication of the origin of each said distinguished call is in a form useful to enable the respective subscriber to dynamically and selectively vary parameters of application of extended services relative to said predetermined line while a respective instantly distinguished call is waiting to be connected to said line; said parameters including functions determining a variable number of unanswered ringing tones to be applied to said predetermined line before other action is undertaken in respect to the waiting call, as well as functions specifically defining the type of other action to be taken after the predetermined number of unanswered rings; said pre-defined type of other action being a specified one of a plurality of actions including: forwarding the waiting call to the authorized subscriber per se; forwarding the waiting call to a voice mail facility internal to the PSTN; and terminating the waiting call with an indication to the respective caller that the call cannot be completed.

* * * * *